Figure 1:
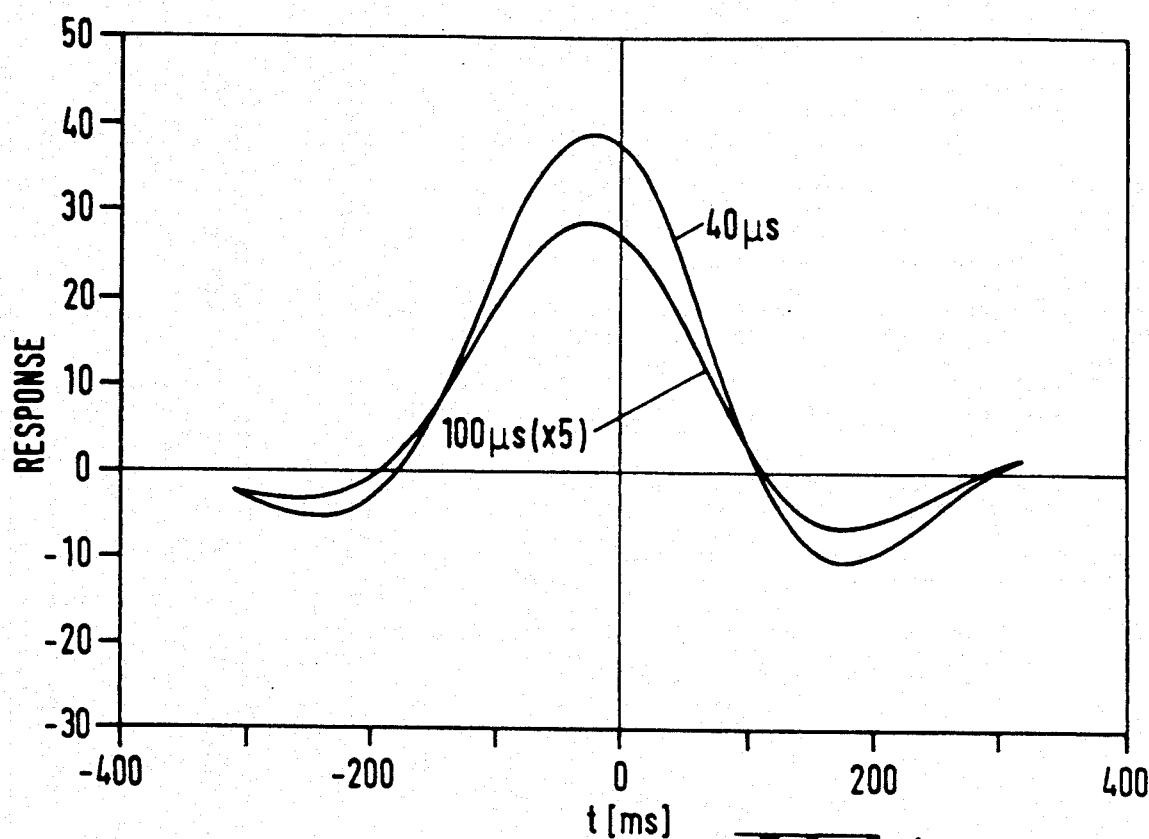

United States Patent [19]

Aittoniemi et al.

[11] Patent Number: 5,047,718
[45] Date of Patent: Sep. 10, 1991

[54] IMPROVING THE DISCRIMINATION OF AN IMPULSE TECHNIQUE METAL DETECTOR BY CORRELATING RESPONSES INSIDE AND OUTSIDE OF A CUT-OFF PEAK AREA

[75] Inventors: Kari T. J. Aittoniemi; Ari T. Järvi, both of Espoo, Finland

[73] Assignee: Outokumpu Oy, Helsinki, Finland

[21] Appl. No.: 472,582

[22] Filed: Jan. 30, 1990

[30] Foreign Application Priority Data

Jan. 31, 1989 [FI] Finland .................................. 890463

[51] Int. Cl.$^5$ ...................... G01R 33/00; G01R 33/12; G01V 3/11; G08B 13/24
[52] U.S. Cl. .................................... 324/239; 324/329; 340/551
[58] Field of Search ............... 324/232, 233, 239, 329; 340/551, 568, 572

[56] References Cited

U.S. PATENT DOCUMENTS

| | | | |
|---|---|---|---|
| 3,686,564 | 8/1972 | Mallick, Jr. et al. | 324/232 |
| 3,707,672 | 12/1972 | Miller et al. | 324/239 |
| 4,563,644 | 1/1986 | Lenander et al. | 324/232 |
| 4,605,898 | 8/1986 | Aittoniemi et al. | 340/551 X |
| 4,816,758 | 3/1989 | Theissen et al. | 324/232 X |
| 4,894,619 | 1/1990 | Leinonen et al. | 324/239 X |

*Primary Examiner*—Gerard R. Strecker
*Attorney, Agent, or Firm*—Brooks Haidt Haffner & Delahunty

[57] ABSTRACT

The invention relates to a method for detecting metal objects, particularly to improving discrimination in a metal detector, where at least two responses are defined for metal objects passing through the metal detector. According to the invention, the correlation of the responses is examined within a determined time period in the metal detector, and at least one parameter is formed of these responses in order to define the group of objects that caused the response.

6 Claims, 1 Drawing Sheet

IMPROVING THE DISCRIMINATION OF AN IMPULSE TECHNIQUE METAL DETECTOR BY CORRELATING RESPONSES INSIDE AND OUTSIDE OF A CUT-OFF PEAK AREA

The present invention relates to a method for detecting metal objects, and particularly to improved discrimination in a metal detector.

While employing a metal detector for checking large groups of people, the most remarkable slow-down factors in the process are the false alarms created by small, harmless objects. To find out the cause for these alarms may take time and build up queues at the checkpoints. At the same time, however, all firearms must naturally cause an alarm. This capacity of the metal detector to distinguish a dangerous, relatively large object among several small and harmless objects is called discrimination.

It has been attempted to improve the discrimination of a metal detector by means of various different methods, for instance by evening out the sensitivity distribution by improved coil planning. This is important, because the sensitivity of the apparatus is generally set according to the most insensitive point. Thus, if the sensitivity distribution is uneven, remarkably small objects may cause an alarm at the most sensitive points of the gate. The sensitivity distribution has been improved for instance by means of a two-channel system, such as in the U.S. Pat. No. 4,605,898, where two transmitter/receiver sets are employed. Moreover, the sensitivity distribution can be improved by means of computer aided coil planning.

Discrimination can also be intensified by trimming the timing of the metal detector. But in the employed devices there is generally used only one measuring window, which is placed after the cut-off of the transmitter current. It is not, however, possible to achieve any essential improvement in the discrimination by means of this method.

In order to improve the discrimination, the coils of the metal detector can be designed so that a group of N similar objects distributed in a wide area creates a remarkably smaller response than the response of one such object multiplied by N. A corresponding system is for instance the coil system described in the U.S. Pat. No. 4,605,898, which is composed of adjacent loops coiled in opposite directions.

From the FI patent application Ser. No. 863,309, of which application U.S. Pat. No. 4,894,619 claims the priority date of Aug. 15, 1986, there is known a detecting method for metal objects, wherein the response from the cut-off peak area is sampled at two different measuring periods. The method in question relates to an improvement in sensitivity and material recognition, and cannot be applied to the improvement of discrimination in a metal detector, because, according to the method, only a possible exceeding of the alarm limit is observed, but not the correlation of the response from the cut-off peak area with the response from outside the cut-off peak area. The disclosure of said U.S. Pat. No. 4,894,619 is incorporated herein by reference in its entirety, especially for its description of the relationship between impulses received by the receiving coil of an impulse technique metal detector and the cut-off peak.

The object of the present invention is to eliminate some of the drawbacks of the prior art and to achieve an improved method for detecting metal objects so that innocent small objects can be distinguished from dangerous large objects.

According to the invention, the material passing through the metal detector is detected for a response with at least two different delays, so that at least one response is defined within the area of the cut-off peak, and respectively at least one response is defined outside the area of the cut-off peak, and the correlation of the responses is examined within a given period of time. Thus one fairly large object behaves in a different fashion than several small objects, and the discrimination can be improved by observing the correlation between the response given by the material with a long delay and a short-delay response. By employing in the measuring of the responses an equal amount of channels and/or frequencies as there are responses, both the long and short delay responses can be determined essentially simultaneously. By placing the measured responses, by means of a time variable, to the same time variable-response coordinates, it can be maintained that with a fairly large object, the maximum absolute values of the responses with different delays are achieved simultaneously—whereas with a number of objects when the absolute value of the short delay response reaches its maximum, the long delay response is not far from zero.

In a metal detector using pulse technique, the transmitter pulse sequence consists of a number of regularly repeated identical pulses with alternating polarities, with a repetition frequency of for instance 1 kHz. Respectively, samples are taken after each sequence with alternating polarities.

The general operating principles of electromagnetic metal detectors have been described, for example, in U.S. Pat. No. 3,588,685, and these principles are well understood in the art, and a detector employing impulse induced eddy current detection is shown in U.S. Pat. No. 4,894,619.

Such a detector tolerates disturbances that are within the repetition frequency, or are its odd harmonic frequencies. The calculatory accuracy of the coefficients that are the basis for the discrimination can in a pulse-operated apparatus be improved by arranging the sampling so that the long and short delay responses are measured by employing different repetition frequencies, that are advantageously in an integral relation to each other. For instance, the measuring of the short delay can be carried out with the repetition frequency 500 Hz, and the measuring of the long delay with the repetition frequency 1 kHz. In the former measurement, the tolerated distrubances are at the frequencies 500 Hz, 1.5 kHz, 2.5 kHz, 3.5 kHz etc., and in the latter measurement at the frequencies 1 kHz, 3 kHz, 5 kHz etc. To the responses measured with different delays, there are thus connected disturbances of different frequencies, which disturbances are attenuated while determining the distinctive parameters. In order to define the maximum point of the absolute value of the short delay according to the invention avoiding any measuring noise, the parameter a can be defined, according to the formula (1):

$$a = \frac{\int A_S A_L dt}{\int |A_S| dt} \tag{1}$$

where $A_S$ and $A_L$ are the responses measured with a short and a long delay. In the formula (1), the integration is extended over the time variable t while the material under measurement passes through the metal detector. The parameter a is a correlation coefficient, which is also comparable to the size of the response with a long delay. The absolute value of the parameter is great, if the responses are essentially with like signs during the whole measuring period, i.e. if the responses with both long and short delays reach their maximum and/or minimum essentially simultaneously. This is the case if the object to be detected is a single, relatively big object. In the co-influence of several objects, the responses measured with different delays correlate poorly with each other, in which case the absolute value of the parameter a remains small, because the responses of the long and short delays do not reach the maximum of their absolute values simultaneously. When employing the method of the present invention, an alarm is given, if the parameter a exceeds the preset alarm limit.

The responses of the method of the present invention also lead to other parameters, as is illustrated in formulas (2) and (3).

$$b = \frac{\int A_S A_L dt}{\sqrt{\int A_S^2 dt}} \quad (2)$$

$$c = \frac{\int A_S A_L dt}{\sqrt{\int A_S^2 dt} \sqrt{\int A_L^2 dt}} \quad (3)$$

The parameter c of formula (3) is a real correlation coefficient, which obtains values within the range $[-1, +1]$. Because the parameter c is not comparable to the size of the response, it cannot be used alone as a distinctive parameter, but the parameter c can be used for instance together with the parameter b to determine the group of objects. The parameter b of formula (2) is comparable to the parameter c and also to the long delay response. Thus the parameter b distinguishes from the long delay response the part that correlates with the short delay response. Because the parameter b also is comparable to the signal size, the detection of metal objects can be based on it.

When calcualting the coefficients of formulas (1)–(3), a predetermined integration time is applied. The metal detector can be provided with a photocell system which gives a signal when the person under examination enters the gate. The starting of the integration can be tied to this point of time. In an alternative system, a short delay response is observed and the maximum point of its absolute value determined. In that case the integration is carried out at both sides of this point of time, by utilizing the recorded measuring results. If the integration is timed around the maximum point of the short delay response, the discrimination can be improved, in comparison with the prior art, also by using a short integration time (less than 100 ms), because the maximums of the long and short responses with a single large object take place at the same point of time, and with several smaller objects at different points of time.

In a preferred embodiment of the invention, the time section is chosen so that the observed period of time is the time when the material passing through the metal detector remains within the detection zone, the length whereof varies from 1 to 2 s.

In an apparatus employing the method of the present invention, there can also be taken several samples with different delays, on the basis of which samples there can be defined several distinctive parameters and/or coefficients based on the parameters, in order to detect the number of objects contained in the material under examination. While forming the alarm, a combination of several parameters can be used.

Figure 2:
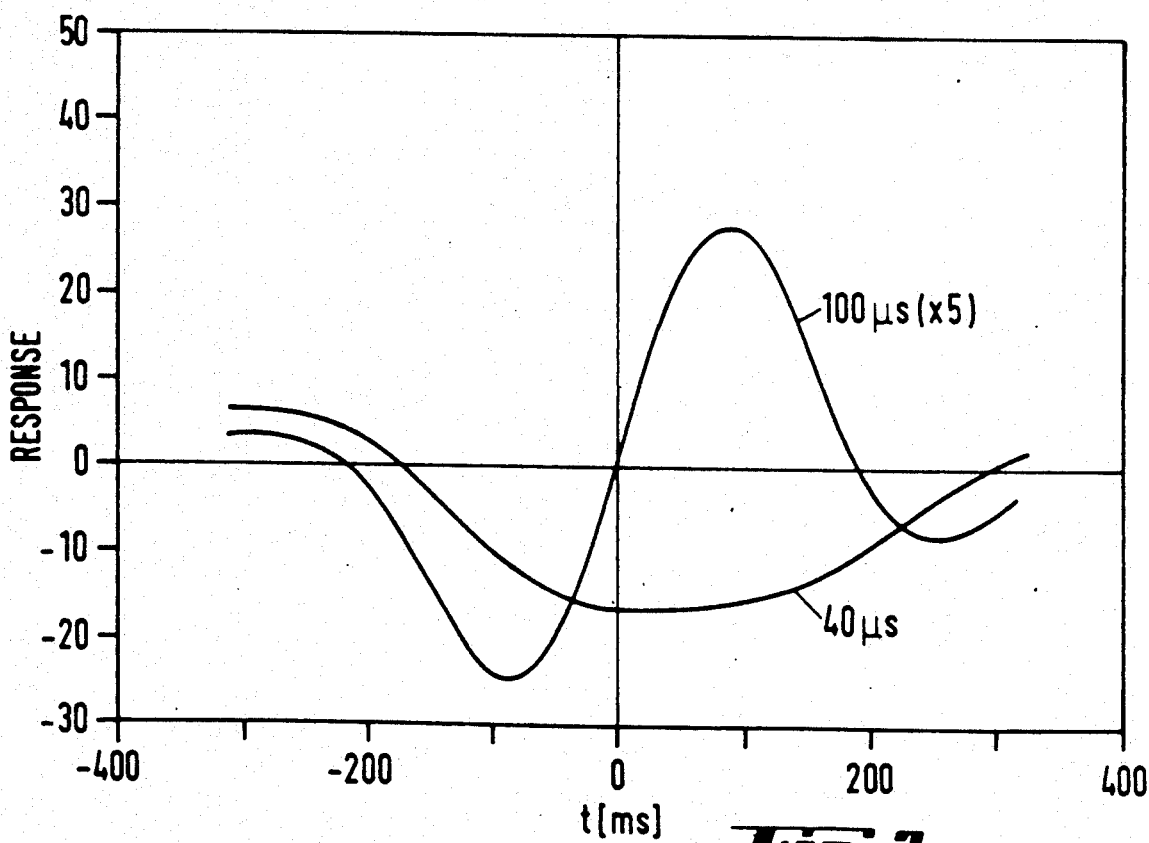

The invention is explained in more detail below with reference to the appended drawings, where FIG. 1 illustrates a response, obtained by employing a preferred embodiment of the present invention, and by means of computer simulation, as a function of time when a fairly large metal object has been passed through the metal detector, and FIG. 2 illustrates a response, obtained by employing the preferred embodiment of FIG. 1 and by means of computer simulation, as a function of time when a group of several small metal objects have been passed through the metal detector.

According to FIG. 1, a dangerously large metal object, such as a gun, has been passed through the metal detector. While the metal object has passed through the metal detector, the response given by it has been measured with two different delays, i.e. 40 microseconds and 100 microseconds after the cut-off of the current pulse. Thus the short delay, 40 microseconds, falls within the area of the pulse cut-off peak. The cut-off peak takes about 50–60 microseconds. Hence the second measured delay, 100 microseconds, is outside the area of the pulse cut-off peak. The computer-simulated responses from a fairly large metal object are placed, by means of a time variable, within the same coordinates according to FIG. 1. Because the response formed outside the pulse cut-off peak area is essentially smaller than the short delay response, the long delay response is in the coordinates represented as multiplied by 5 in order to improve the readability. From FIG. 1 it can be observed that the responses obtained with different delays are similar in form, and their absolute values form their maximum with an essentially same value of the time variable.

FIG. 2 illustrates the results corresponding to FIG. 1 in a case where a group of several small and harmless, at least partly metallic objects has been passed through the metal detector. Such metal objects are for instance a bunch of keys, a pocket calculator, pocket knife, lighter, belt buckle, small change, spectacles and shoes—i.e. objects that a person passing through the metal detector may carry with him. While defining the responses of FIG. 2, the objects are placed, with respect to the metal detector, so that they for instance in height correspond to their normal location around the human body, such as a bunch of keys in the trouser pocket. From FIG. 2 it can be observed, that the responses obtained with different delays are essentially different in form, in which case the maximum points of the absoulte values of the responses fall in essentially deviant points.

From the responses illustrated in FIGS. 1 and 2, there can be formed a distinctive parameter a by means of the formula (1), when in the formula (1) $A_S$ is replaced by the response obtained with the delay of 40 microseconds, and $A_L$ is replaced by the response obtained with the delay of 100 microseconds. The integration of the formula (1) can be carried out as a function of time within the range of $(-320 \text{ ms}, 320 \text{ ms})$. In the following there are given, in relative units, the maximum values obtained with different delays, as well as the distinctive parameter according to formula (1):

|  | FIG. 1 | FIG. 2 |
| --- | --- | --- |
| Max 40 μs | 38.4 | 15.8 |

| | FIG. 1 | FIG. 2 |
|---|---|---|
| Max 100 μs | 5.7 | 5.6 |
| Parameter | 3.87 | −0.64 |

From the values of the parameter a it is observed that while a fairly large metal object, such as a gun, passes through the metal detector, the absolute value of the parameter a is larger, whereas the absolute value of the parameter a is small when small objects pass through the metal detector. Thus for the parameter a there can be predetermined a value, the so-called alarm limit, which causes an alarm when exceeded. Thus the alarm is given only in the case of a fairly large single object.

Although the invention has above been applied to a pulse-operated metal detector, it can also be applied to continuously operated metal detectors without essentially deteriorating the invention. In that case the $A_S$ measurement is replaced by a measurement within the frequency range 200–500 Hz, advantageously at the frequency 300 Hz, and the $A_L$ measurement is replaced with a measurement within the frequency range 20–50 kHz, advantageously at 30 kHz. The above illustrated distinctive parameters can also be employed in similar fashion.

We claim:

1. A method for detecting metal objects and for improving discrimination in a pulse operated metal detector comprising measuring at least two different responses in metal objects passing through the metal detector, wherein at least one of the responses is measured inside a cut-off peak area of a generated pulse of the metal detector, and at least one response is measured outside the cut-off peak area, including examining the correlation of the responses within a given period of time in the metal detector, and forming at least one distinctive parameter on the basis of the correlation of said responses in order to determine the nature of objects that caused the response.

2. The method of claim 1 wherein the correlation between the responses is examined within a section of the time variable (t), the length of which section is less than 100 milliseconds.

3. The method of claim 1, wherein the correlation between the responses is examined within a section of the time variable (t), the length of the section being 1–2 seconds.

4. The method of claim 1, wherein the delay of the response from the cut-off peak area is 40 microseconds, and the delay of the response from outside the cut-off peak area is 100 microseconds.

5. The method of claim 1, wherein the sampling frequency of the response inside the cut-off peak area and the sampling frequency of the response outside the cut-off peak area are in integral relation to each other.

6. The method of claim 5, wherein the sampling frequency of the response inside the cut-off peak area is 500 Hz and the sampling frequency of the response outside the cut-off peak area is 1 kHz.

* * * * *